(12) United States Patent
Childress et al.

(10) Patent No.: US 7,873,516 B2
(45) Date of Patent: Jan. 18, 2011

(54) VIRTUAL VOCAL DYNAMICS IN WRITTEN EXCHANGE

(75) Inventors: Rhonda L. Childress, Austin, TX (US);
David Bruce Kumhyr, Austin, TX (US);
Pamela Ann Nesbitt, Tampa, FL (US);
Amy Delphine Travis, Arlinton, MA (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 11/742,157

(22) Filed: Apr. 30, 2007

(65) Prior Publication Data

US 2008/0270141 A1    Oct. 30, 2008

(51) Int. Cl.
*G10L 17/00* (2006.01)
(52) U.S. Cl. ............... 704/246; 704/270; 704/270.1
(58) Field of Classification Search ............... 704/3, 704/231, 270, 272, 270.1, 246; 382/115, 382/116

See application file for complete search history.

(56) References Cited

U.S. PATENT DOCUMENTS

2006/0018519 A1* 1/2006 Siegel et al. ............. 382/116
2007/0274568 A1* 11/2007 Ashbourn ................. 382/115

OTHER PUBLICATIONS

Fagerberg et al., "eMoto: emotionally engaging interaction", Pers Ubiquit Comput (2004) 8, Stockholm, pp. 377-381.

Loy et al., "Development of a Pressure-based Typing biometrics User Authentication System", 2005 ASEAN Virtual Instrumentation Applications Contest Submission, pp. 1-3, retrieved Apr. 30, 2007. http://digital.ni.com/worldwide/singapore.nsf/web/all/ACCD272C9FEF487D8625703D005562A0.

"Force Field", pp. 1-3, retrieved Apr. 30, 2007 http://web.media.mit.edu/~joanie/conductive-chat/forcefield.html.

"The FASTY User Interface", pp. 103, retrieved Apr. 30, 2007 http://www.is.tuwien.ac.at/fortec/reha.e/projects/fasty/german/year3/ui.html.

Avrahami et al., "QnA:Augmenting an Instant Messaging Client to Balance User Responsiveness and Performance", pp. 1-4, ACM 2004, retrieved Apr. 30, 2007 http://www.cs.cmu.edu/~nx6/pubs/Avrahami_CSCW_04.pdf.

* cited by examiner

*Primary Examiner*—Huyen X. Vo
(74) *Attorney, Agent, or Firm*—Yee & Associates, P.C.; Jeffrey S. LaBaw

(57) ABSTRACT

The illustrative embodiments described herein provide a computer implemented method and computer program product for providing context in an electronic text communication. A biometric gathering input device is associated with a sending data processing system. A first set of metrics is identified based on a sender interacting with the biometric gathering input device. A sending communications process on the sending data processing system is calibrated based on the first set of metrics. During the generation of the electronic text communication, a portion of the first set of metrics is identified based on the sender interacting with the biometric gathering input device to form a second set of metrics. The second set of metrics and the electronic text communication are sent from the sending data processing system to a recipient data processing system. The second set of metrics is represented at the recipient data processing system using criteria selected by a recipient of the electronic text communication.

17 Claims, 6 Drawing Sheets

VIRTUAL VOCAL DYNAMICS IN WRITTEN EXCHANGE

BACKGROUND OF THE INVENTION

1. Field of the Invention

The present invention relates generally to an improved data processing system and in particular to a method and apparatus for electronic communications. Still more particularly, the present invention relates to a computer implemented method, and a computer program product for providing virtual vocal dynamics in electronic text communications.

2. Description of the Related Art

Communication is a process by which information is exchanged between or among individuals through a common system of symbols, signs, and behavior. Communication allows people to exchange thoughts or information by one of several methods. For example, auditory means are used, such as speaking or singing, as well as physical means, such as sign language or touch. Another method involves nonverbal means, such as eye contact.

The perceived message is usually a combination of both verbal and nonverbal communication. Verbal communication refers to the words communicated by a person. Nonverbal communication relays the "emotional meaning" we take from other people. Nonverbal communication can be based on a person's facial expressions, body motions, and tone of voice in addition to what the person actually says.

With the advent of electronic text communication, such as electronic mail (e-mail) and instant messaging (IM), the context or nonverbal meaning of communication is often lost because the text message is interpreted based upon the actual text in the absence of nonverbal cues.

Current methods allow users to manually emphasize words. For example, a user may manually bold certain words, manually change the font color, or use all capital letters to provide some distinction from ordinary text and to provide emphasis to the words.

SUMMARY OF THE INVENTION

The illustrative embodiments described herein provide a computer implemented method and computer program product for providing context in an electronic text communication. A biometric gathering input device is associated with a sending data processing system. A first set of metrics is identified based on a sender interacting with the biometric gathering input device. A sending communications process on the sending data processing system is calibrated based on the first set of metrics. During the generation of the electronic text communication, a portion of the first set of metrics is identified based on the sender interacting with the biometric gathering input device to form a second set of metrics. The second set of metrics and the electronic text communication are sent from the sending data processing system to a recipient data processing system. The second set of metrics is represented at the recipient data processing system using criteria selected by a recipient of the electronic text communication.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
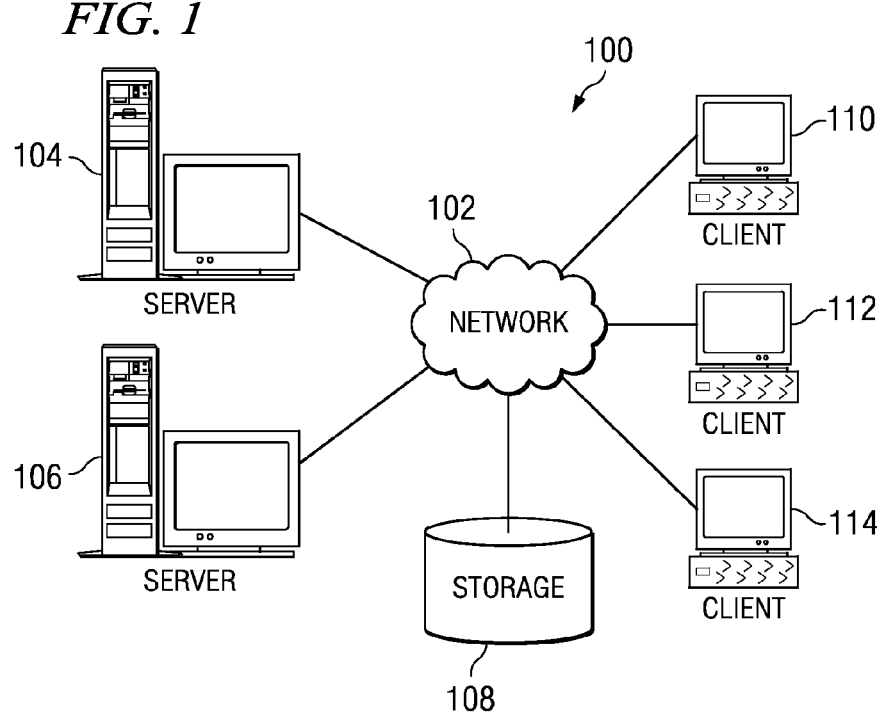
FIG. 1 is a pictorial representation of a network of data processing systems in which illustrative embodiments may be implemented.
Figure 2:
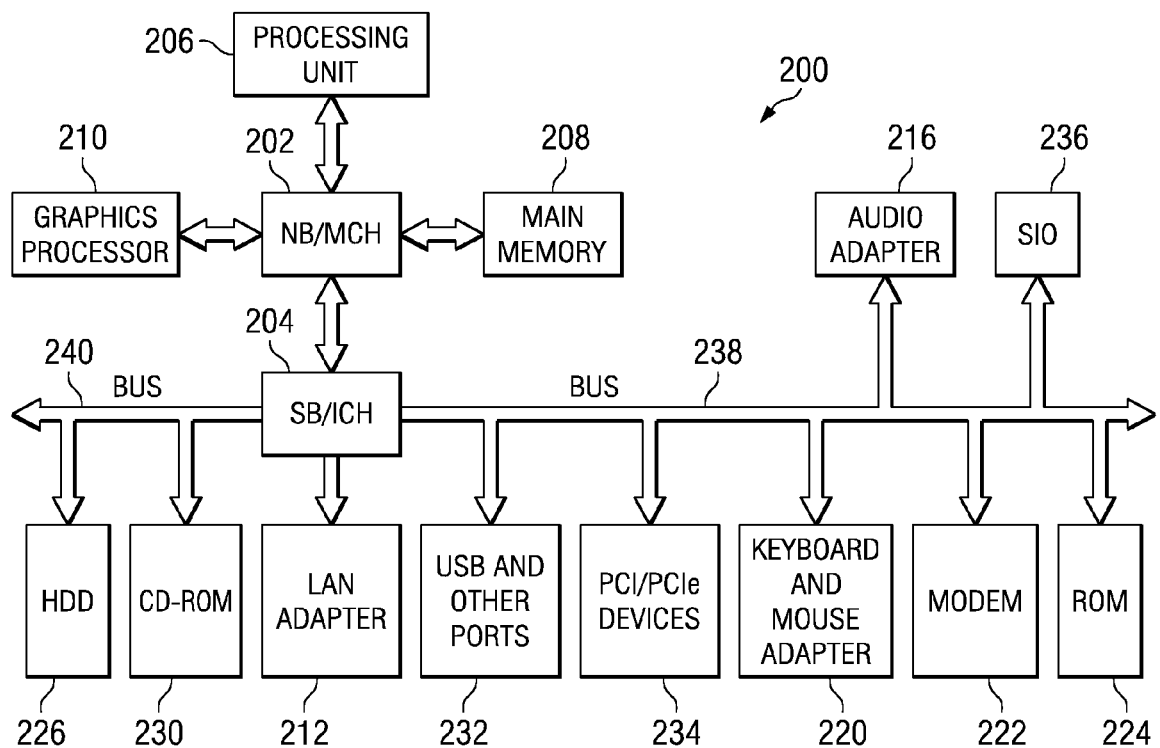
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Network 102 may be, without limitation, a local area network (LAN), wide area network (WAN), Internet, Ethernet, or Intranet. In this example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different illustrative embodiments provide a computer implemented method, apparatus, and computer program product for providing virtual vocal dynamics in written exchange which substantially eliminates or reduces disadvantages and problems associated with previous systems and methods.

For example, a disadvantage associated with previous systems and methods is that the sender of the text message must manually provide the emphasis. This method is time consuming and inconvenient for people who communicate frequently such as in the case with instant messaging. Furthermore, the sender may also forget to provide the necessary emphasis. Another disadvantage associated with previous systems and methods is that the recipient of the electronic text message may not understand the emphasis that is being placed on the electronic text message by the sender.

Therefore, in accordance with one aspect of the present invention, a computer implemented method is presented for providing context in an electronic text communication. An electronic text communication is any text message delivered via an electronic device. Examples of electronic text communications include e-mail, instant messaging, blogging, and text messages sent via cellular phones.

A biometric gathering input device is associated with a sending data processing system. Examples of biometric gathering input device include a pressure sensitive keyboard, fingerprint sensors, cameras, and iris scanners. The biometric gathering input device can determine dynamics associated with a user interacting with the biometric gathering input device. Examples of dynamics received from the biometric gathering input device may include, the pressure asserted upon a key, the length of time between keystrokes, the keystroke that was pressed, and biometrics associated with the user. Biometric is a measurable physiological characteristic of the user. Examples of biometrics may include, determining hand temperature, finger prints, hand geometry, eye structure, and voice pattern.

A first set of metrics is identified based on a sender interacting with the biometric gathering input device. The first set of metrics comprises of at least one or more metrics. A metric is a measurement or a particular benchmark based on the dynamics received from the biometric gathering input device. The first set of metrics may include, for example, identifying the sender's typing speed/speed of engagement, the average pressure asserted upon the keys, the average hand temperature of the sender, the number of corrections performed by the user, and pauses between keystrokes. The first set of metrics may include other metrics not specifically named above and does not require the inclusion of any particular metric or set of metrics.

A sending communications process on the sending data processing system is calibrated based on the first set of metrics. The calibration process adjusts the communications process on the sending data processing system based on the individual user. In other words, the calibration process identifies the base level upon which to identify the metrics for each individual user. For example, if the user typically asserts an above average amount of pressure when striking the keys on the biometric gathering input device, the communications process on the sending data processing system will adjust to indicate that the user asserts an above average amount of pressure when striking the keys. Thus, the communications process on the sending data processing system will not report that the user is striking the keys abnormally hard unless the user is asserting pressure above the user's normal threshold.

During the generation of the electronic text communication, a portion of the first set of metrics is identified based on the sender interacting with the biometric gathering input device to form a second set of metrics. This second set of metrics may be one or more metrics from the first set of metrics or the portion may be the entire set of metrics from the first set of metrics. The second set of metrics and the electronic text communication are sent from the sending data processing system to a recipient data processing system. The second set of metrics is represented at the recipient data processing system using criteria selected by a recipient of the electronic text communication.

Figure 3:
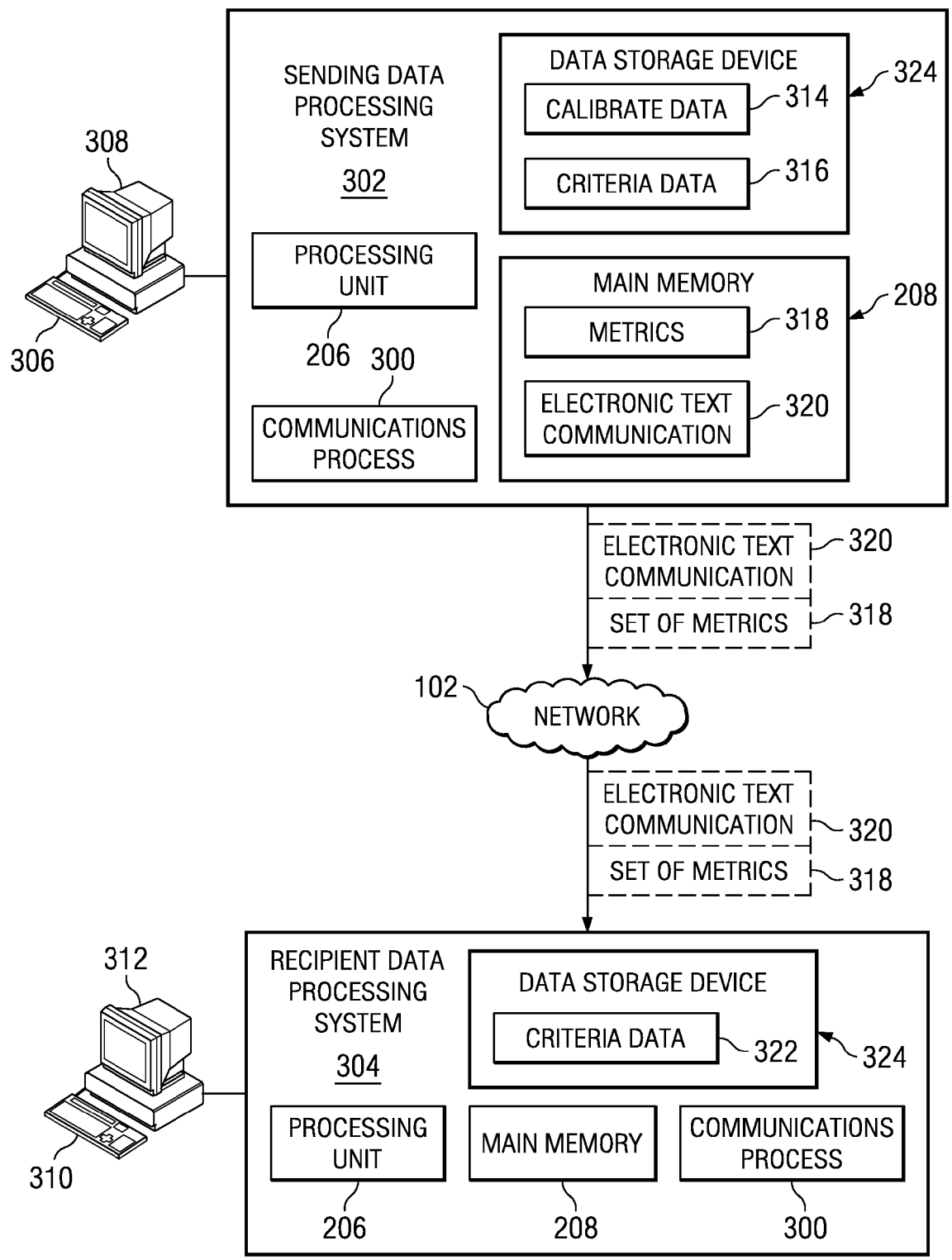
FIG. 3 is a block diagram illustrating a flow of data when an electronic text communication and a set of metrics are generated in accordance with an illustrative embodiment.

FIG. 3 is a block diagram illustrating a flow of data when an electronic text communication and a set of metrics are generated in accordance with an illustrative embodiment. FIG. 3 depicts two data processing systems, sending data processing system 302 and recipient data processing system 304. Sending data processing system 302 and recipient data processing system 304 may be implemented in any type of computing device, including but not limited to a desktop computer, laptop computer, cellular phone, and a personal digital assistant (PDA). For example, sending data processing system 302 and recipient data processing system 304 may be implemented using any computing device shown in FIG. 1 or data processing system 200 in FIG. 2. Sending data processing system 302 and recipient data processing system 304 communicate through network 102 in FIG. 1.

Sending data processing system 302 and recipient data processing system 304 each include communications process 300. Communications process 300 is a software component in which features of the illustrative embodiments can be implemented within. Communications process 300 may also be an auxiliary program, such as a plug-in.

Biometric gathering input device 306 and display device 308 are associated with sending data processing system 302. Sending data processing system 302 further comprises processing unit 206, data storage device 324, and main memory 208. Data storage device 324 is any device capable of storing data, including but not limited to a hard disk drive, flash memory, and any computer recordable media.

Calibration data 314 and user's criteria data 316 are stored in data storage device 324. Calibration data 314 is the data that adjusts the base level upon which to determine the metrics for each individual user. Criteria data 316 is the set of preferences chosen by the sender to determine how the set of metrics will be rendered on sending data processing system 302.

Figure 4:
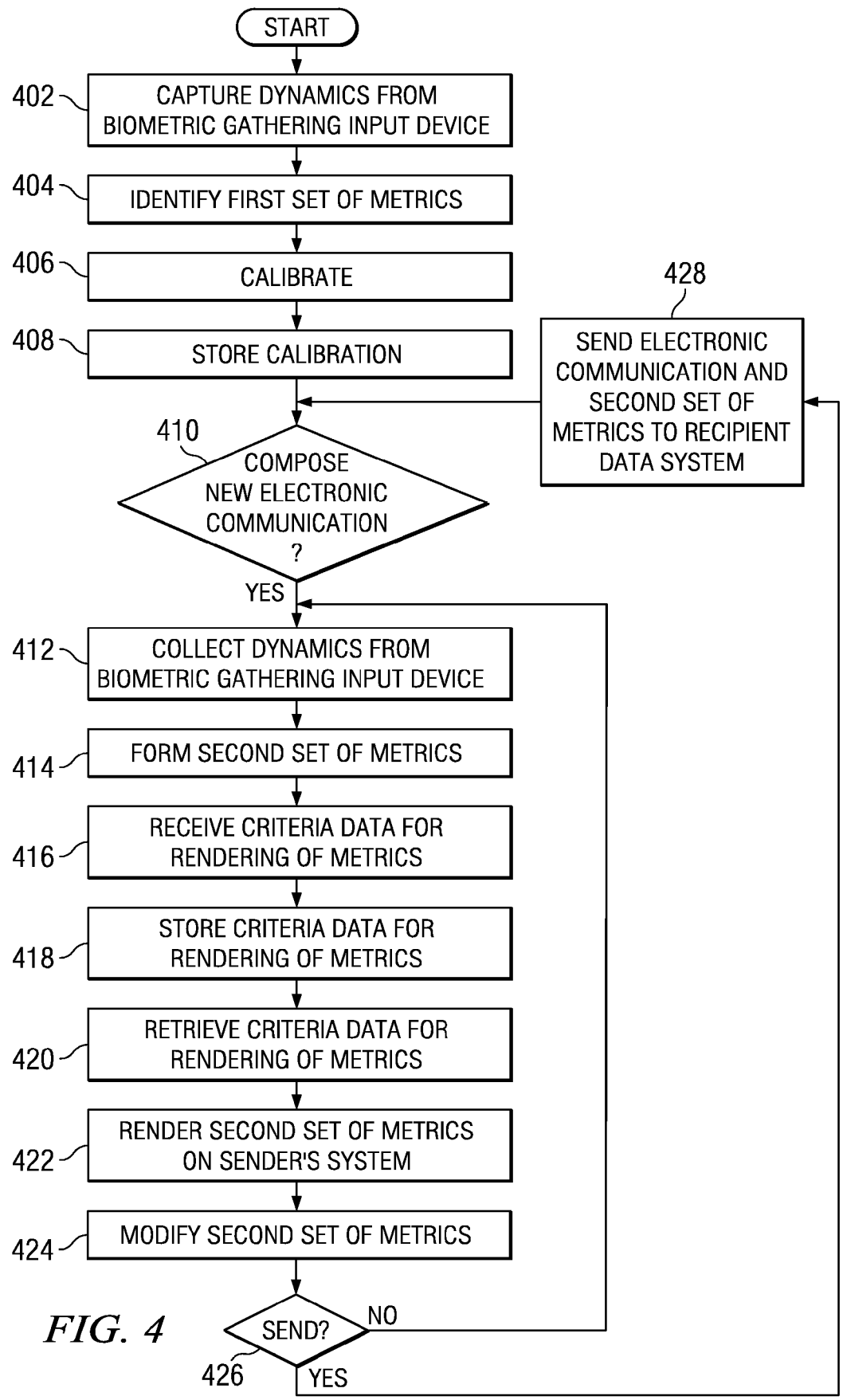
FIG. 4 is a flowchart illustrating a process for sending a set of metrics in conjunction with an electronic text communication in accordance with an illustrative embodiment.

As will be further described in FIG. 4, during the generation of electronic text communication 320, a set of metrics 318 is also generated. Both electronic text communication 320 and metrics 318 are stored in main memory 208. Communications process 300 on sending data processing system 302 sends electronic text communication 320 and metrics 318 to recipient data processing system 304.

In one embodiment, electronic text communication 320 and metrics 318 are rendered on display device 308 during the generation of electronic text message 320 using criteria data 316. This process is also referred to as "echoing" the set of metrics. Display device 308 is any type of device capable of displaying content to the user. For example, display device 308 may include, without limitation, a desktop monitor, laptop screen, cellular phone display, television screen, or any other electronic display device.

Recipient data processing system 304 also comprises processing unit 206, data storage device 324, main memory 208, and communications process 300. Recipient data processing system 304 is associated with input device 310 and a display device 312. Input device 310 may or may not be a biometric gathering input device. Communications process 300 on recipient data processing system 304 stores the recipient's criteria data 322 in data storage device 324. Communications process 300 on recipient data processing system 304 uses criteria data 322 to render electronic text communication 320 and metrics 318 received from sending data processing system 302 on display device 312.

In another embodiment, communications process 300 on sending data processing system 302 notifies the sender whether or not recipient data processing system 304 is capable of presenting the set of metrics. For example, communications process 300 on sending data processing system 302 may pop up a window notifying the sender that recipient data processing system 304 is not capable of presenting the set of metrics. Alternatively, communications process 300 on sending data processing system 302 may disable echoing the set of metrics, the ability to modify the set of metrics, or both to indicate that recipient data processing system 304 is not capable of presenting the set of metrics.

In yet another embodiment, communications process 300 on sending data processing system 302 may send recipient data processing system 304 an interjection. An interjection is an electronic text communication that is rendered differently from a normal electronic text communication in order to prompt or attract the attention of the recipient. For example, if the sender anticipates not liking the direction the electronic text communication conversation is heading, the sender may send an interjection to change the direction of the conversation. The interjected message may be rendered in large text, colored text, colored background, audibly, or any other method to attract the attention of the recipient.

In another illustrative embodiment, communications process 300 on recipient data processing system 304 may process electronic text communication 320 and metrics 318 through the use of a screen reader application (not shown). The screen reader application reads the electronic text message using criteria data 322 to reflect the proper context of the electronic text communication. For example, the screen reader application may shout. In other words, the screen reader application may increase the volume during a portion of the electronic text communication that is indicative of the sender being assertive.

FIG. 4 is a flowchart illustrating a process for sending a set of metrics in conjunction with an electronic text communication in accordance with an illustrative embodiment. The process in FIG. 4 may be implemented in a software component in a sending data processing system, such as communications process 300 in sending data processing system 302 in FIG. 3.

The process captures the dynamics received from a biometric gathering input device (step 402). Based on the dynamics received from the biometric gathering input device, the process identifies a set of metrics (step 404). The process calibrates the software component in the sending data processing system using the set of metrics formed at step 404 (step 406).

The process stores the calibration data in a storage device, such as data storage device 324 in FIG. 3 (step 408). The calibration data may be loaded into main memory 208 for execution by processing unit 206 in FIG. 2.

The process monitors the data processing system to make a determination as to whether the user is composing a new electronic text communication (step 410). If the process determines that a new electronic text communication is being generated, the process collects the dynamics received from the biometric gathering input device (step 412), to form a new set of metrics (step 414).

In one illustrative embodiment, the process receives criteria data from a sender for rendering the set of metrics on the sender's display (step 416). The sender's criteria data is stored in a storage device, such as data storage device 324 in FIG. 3 (step 418). The process retrieves the criteria data and may load the criteria data into a main memory for execution (step 420). The process echoes the electronic text communication and the set of metrics formed at step 414 on the sender's display using the criteria data (step 422). If the set of metrics formed at step 414 changes during the generation of the electronic text communication, the process will dynamically echo the electronic text communication with the updated set of metrics using the criteria data.

For example, if the initial set of metrics determined that the user was being assertive by striking the keys above the normal threshold; portions of the electronic text communication may be bolded to indicate the user's assertiveness. However, if the user then deletes portions of the electronic text communication in which he was assertive and retypes the electronic text communication asserting the normal pressure upon the keys then the set of metrics dynamically renders the edited electronic text communication in normal font. In another example, if the user deletes a certain portion of text more than once, the metrics may render that portion of text in a lighter font to indicate that the user was being indecisive.

Alternatively, the user may choose to modify the set of metrics (step 424). For example, if the user decides that the rendering of portions of the electronic text communication as indicating assertiveness is incorrect or the user does not want the recipient to be aware that he is being assertive, the user may modify the set of metrics to delete the data in the set of metrics that would render the text as indicating assertiveness.

Steps 416 through 424 are optional steps of an illustrative embodiment. If steps 416 through 424 were excluded from FIG. 4, step 414 would proceed to step 426. Furthermore, steps 416, 418, and 420 are not required to be performed at any given point in FIG. 4 except prior to step 422. For example, steps 416, 418, and 420 may be performed immediately after step 400.

The process monitors the electronic text communication to make a determination as to whether a send command has been entered (step 426). If a send command has not been entered, the process continues to collect the dynamics received from the biometric gathering input device (step 412), and dynamically updates the set of metrics (step 414).

In response to a send command being entered, the process sends the electronic text communication and the set of metrics formed at step 414 to a recipient data processing system (step 428). The process returns to step 410 and waits for a new electronic text communication to be generated.

Figure 5:
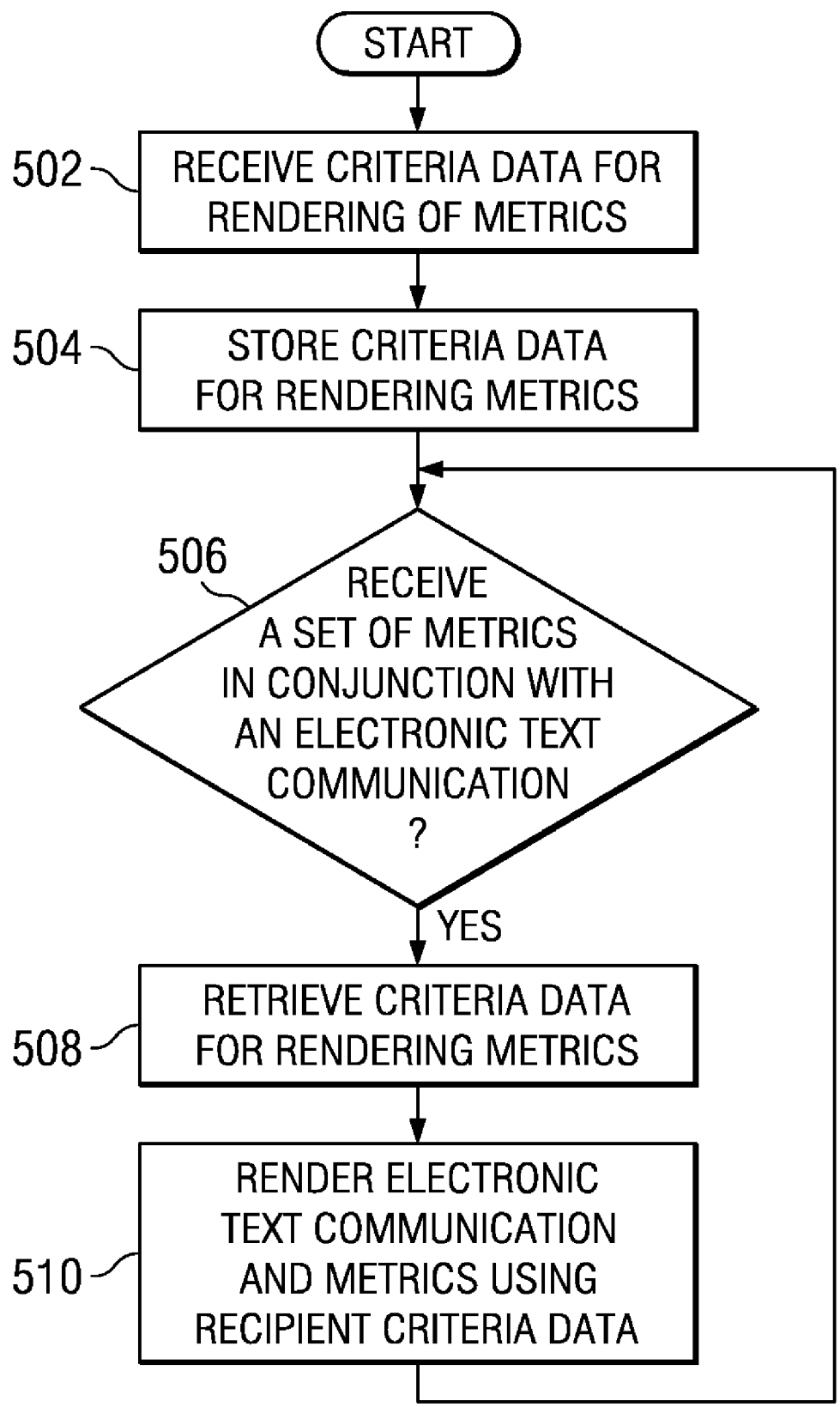
FIG. 5 is a flowchart illustrating a process for receiving a set of metrics in conjunction with an electronic text communication in accordance with an illustrative embodiment.

FIG. 5 is a flowchart illustrating a process for receiving a set of metrics in conjunction with an electronic text communication in accordance with an illustrative embodiment. The process in FIG. 5 may be implemented in a software component in a recipient data processing system, such as communications process 300 in recipient data processing system 304 in FIG. 3.

The process on the recipient data processing system receives criteria data, set by the recipient, for rendering the set of metrics received in conjunction with the electronic text communication on the recipient data processing system (step 502). For example, the recipient may choose to render a pause between keystrokes as a sequence of dots, or the recipients may choose to render a pause as a sequence of blank spaces. The process stores the recipient's criteria data for rendering the set of metrics in a storage device, such as data storage device 324 in FIG. 3 (step 504).

The process makes a determination as to whether a set of metrics is received in conjunction with an electronic text communication (step 506). In response to receiving a set of metrics and an electronic text communication, the process retrieves the recipient's criteria data (step 508).

The process renders the electronic text communication and the set of metrics using the recipient's criteria data (step 510). The process then returns to step 506 to make a determination as to whether a new set of metrics is received in conjunction with a new electronic text communication.

Figure 6:
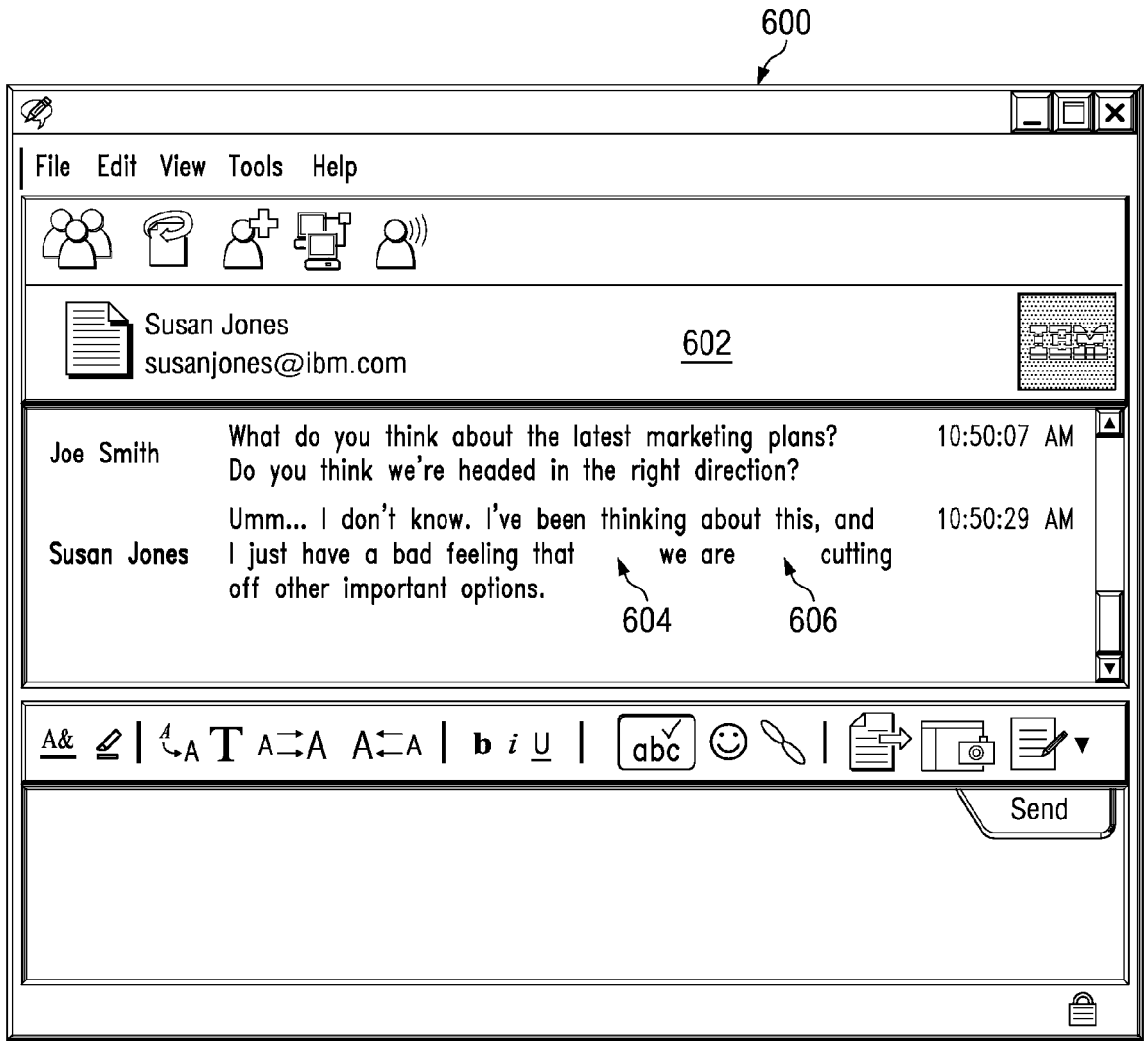
FIG. 6 is a screenshot illustrating the rendering of a set of metrics in conjunction with an electronic text communication in accordance with an illustrative embodiment.

FIG. 6 is a screenshot illustrating the rendering of a set of metrics in conjunction with an electronic text communication in accordance with an illustrative embodiment. In FIG. 6, instant messaging window 600 is shown. Instant messaging window 600 displays the name of user 602. In this illustrative embodiment user 602 is responding to an instant message. The composition of the electronic text message is echoed on instant messaging window 600 using user 602's criteria. For example, user 602, at step 316 in FIG. 3, has set her criteria for showing pauses between keystrokes to be rendered as a sequence of blank spaces as indicated by items 604 and 606. The pauses may signify that user 602 is thinking about the response or uncertain about the appropriate reply.

Alternatively, user 602 may modify the set of metrics formed at step 414 in FIG. 4. For example, if user 602 does not want the recipient to be aware that she is being hesitant or user 602 believes that the rendering of the electronic text communication as indicating hesitancy is incorrect, then user 602 may modify the set of metrics to delete the data in the set of metrics that would render the text as indicating hesitancy.

Figure 7:
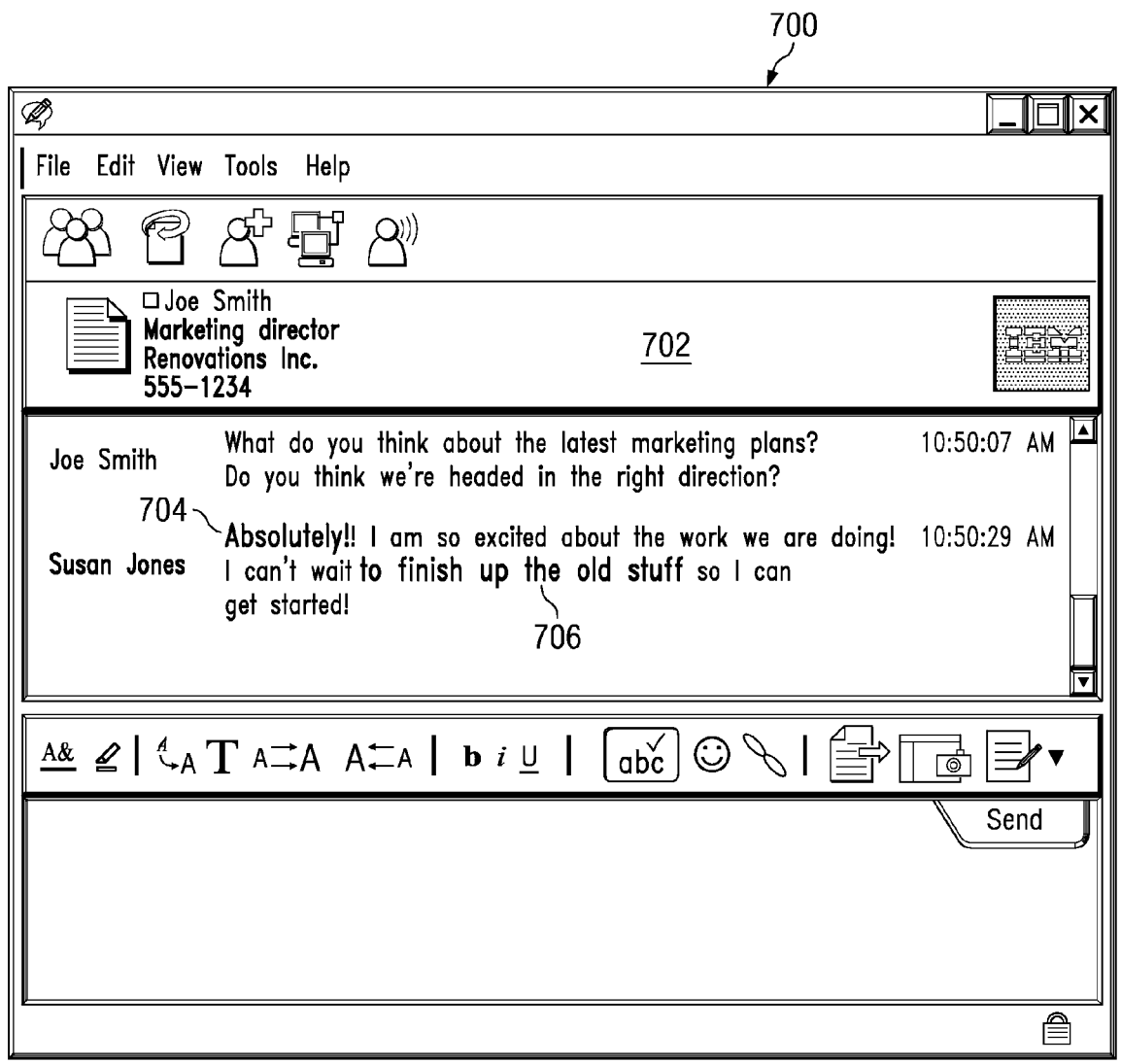
FIG. 7 is a screenshot illustrating the rendering of a set of metrics in conjunction with an electronic text communication in accordance with another illustrative embodiment.

FIG. 7 is a screenshot illustrating the rendering of a set of metrics in conjunction with an electronic text communication in accordance with an illustrative embodiment. In FIG. 7, instant messaging window 700 is shown. Instant messaging window 700 displays the name of user 702. In this illustrative embodiment, user 702 is the recipient of an instant message from user 602. User 702, at step 502 in FIG. 5, has set his criteria for indicating that a sender is asserting above normal pressure on the biometric input device to be rendered as bolded text, as indicated by items 704 and 707. The bolded text may signify that user 602 is excited about the response.

Thus, an improved computer implemented method has been described above for providing virtual vocal dynamics in written exchange which substantially eliminates or reduces disadvantages and problems associated with previous systems and methods.

Thus, the illustrative embodiments provide a computer implemented method, apparatus, and computer usable program code for providing context in an electronic text communication. A biometric gathering input device is associated with a sending data processing system. A first set of metrics is identified based on a sender interacting with the biometric gathering input device. A sending communications process on the sending data processing system is calibrated based on the first set of metrics. During the generation of the electronic text communication, a portion of the first set of metrics is identified based on the sender interacting with the biometric gathering input device to form a second set of metrics. The second set of metrics and the electronic text communication are sent from the sending data processing system to a recipient data processing system. The second set of metrics is represented at the recipient data processing system using criteria selected by a recipient of the electronic text communication.

Accordingly, the present invention eliminates the need to manually provide context to electronic text communication. Furthermore, the present invention allows the recipient of an electronic text communication to automatically provide non-verbal cues and context to an electronic text communication that is understood by the recipient.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing context in an electronic text communication, the method comprising:
   identifying, by a processing unit in a computer, a first set of metrics based on a sender interacting with a biometric gathering input device, wherein the biometric gathering input device is associated with a sending data processing system;
   calibrating, by the processing unit, a sending communications process on the sending data processing system based on the first set of metrics;
   identifying, by the processing unit, a portion of the first set of metrics based on the sender interacting with the biometric gathering input device during generation of the electronic text communication to form a second set of metrics; and
   sending the second set of metrics and the electronic text communication from the sending communications process on the sending data processing system to a recipient data processing system, wherein the second set of metrics is represented at the recipient data processing system using criteria selected by a recipient of the electronic text communication.

2. The computer implemented method of claim 1, further comprising:
   rendering the second set of metrics and the electronic text communication visually on the sending data processing system using the criteria set by the sender, wherein the rendering of the second set of metrics on the sending data processing system dynamically changes based on actions generated by the sender during the generation of the electronic text communication; and
   permitting the sender to modify the second set of metrics prior to sending the second set of metrics from the sending data processing system to the recipient data processing system.

3. The computer implemented method of claim 1, further comprising:

notifying the sender as to whether the recipient data processing system is capable of presenting the second set of metrics.

4. The computer implemented method of claim 1, further comprising:
permitting the sender to send to the recipient an interjection, wherein the interjection includes an audio or visual prompt to attract the attention of the recipient.

5. The computer implemented method of claim 1, wherein the manner of presenting the second set of metrics includes audibly presenting the second set of metrics by a screen reader application based on the recipient's criteria.

6. The computer implemented method of claim 1, wherein the first set of metrics comprises at least one of determining a speed of engagement, pauses between keystrokes, pressure asserted upon a key, number of corrections performed by the sender associated with the generation of the electronic communication, and the hand temperature of the sender.

7. The computer implemented method of claim 1, wherein the biometric input gathering device is a pressure sensitive keyboard.

8. A computer implemented method for providing context in an electronic text communication, the method comprising:
setting a criteria for rendering metrics;
storing the criteria for rendering the metrics;
responsive to receiving a set of metrics and the electronic text communication from a sending data processing system, retrieving, by a processing unit in a computer, the criteria for rendering the metrics, wherein the set of metrics are generated by the processing unit based on a sender of the electronic text communication interacting with a biometric gathering input device during the generation of the electronic text communication; and
responsive to retrieving the criteria, presenting the electronic text communication and the set of metrics using the criteria for rendering the metrics, wherein presenting the electronic text communication provides context to the electronic text communication.

9. The computer implemented method of claim 8, wherein the step of presenting the electronic text communication and the set of metrics using the criteria for rendering the metrics includes audibly presenting the second set of metrics by a screen reader application based on the recipient's criteria.

10. The computer implemented method of claim 8, wherein the set of metrics includes at least one of determining a speed of engagement, pauses between keystrokes, pressure asserted upon a key, number of corrections performed by the sender associated with the composition of the electronic communication, and the hand temperature of the sender.

11. A computer program product comprising a non-transitory computer readable storage medium comprising: the non-transitory computer readable storage medium encoded with computer usable program code, the computer usable program code for execution by the computer, comprising:
computer usable program code for identifying a first set of metrics based on a sender interacting with a biometric gathering input device, wherein the biometric gathering input device is associated with a sending data processing system;
computer usable program code for calibrating a sending communications process on the sending data processing system based on the first set of metrics;
computer usable program code for identifying a portion of the first set of metrics based on the sender interacting with the biometric gathering input device during generation of the electronic text communication to form a second set of metrics; and
computer usable program code for sending the second set of metrics and the electronic text communication from the sending communications process on the sending data processing system to a recipient data processing system, wherein the second set of metrics is represented at the recipient data processing system using criteria selected by a recipient of the electronic text communication.

12. The computer program product of claim 11 further comprising:
computer usable program code for rendering the second set of metrics and the electronic text communication visually on the sending data processing system using the criteria set by the sender, wherein the rendering of the second set of metrics on the sending data processing system dynamically changes based on actions generated by the sender during the generation of the electronic text communication; and
computer usable program code for permitting the sender to modify the second set of metrics prior to sending the second set of metrics from the sending data processing system to the recipient data processing system.

13. The computer program product of claim 11 further comprising:
computer usable program code for notifying the sender as to whether the recipient data processing system is capable of presenting the second set of metrics.

14. The computer program product of claim 11 further comprising:
computer usable program code for permitting the sender to send to the recipient an interjection, wherein the interjection includes an audio or visual prompt to attract the attention of the recipient.

15. The computer program product of claim 11, wherein the manner of presenting the second set of metrics includes computer usable program code for audibly presenting the second set of metrics by a screen reader application based on the recipient's criteria.

16. The computer program product of claim 11, wherein the first set of metrics comprises at least one of determining a speed of engagement, pauses between keystrokes, pressure asserted upon a key, number of corrections performed by the sender associated with the generation of the electronic communication, and the hand temperature of the sender.

17. The computer program product of claim 11, wherein the biometric input gathering device is a pressure sensitive keyboard.

* * * * *